(12) United States Patent
Le et al.

(10) Patent No.: US 10,703,315 B2
(45) Date of Patent: Jul. 7, 2020

(54) COLLISION SENSING APPARATUS

(71) Applicant: Ford Global Technologies, LLC, Dearborn, MI (US)

(72) Inventors: Jialiang Le, Canton, MI (US); Manoharprasad K. Rao, Novi, MI (US); David James Tippy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 45 days.

(21) Appl. No.: 15/819,797

(22) Filed: Nov. 21, 2017

(65) Prior Publication Data

US 2018/0093629 A1 Apr. 5, 2018

Related U.S. Application Data

(62) Division of application No. 14/313,067, filed on Jun. 24, 2014, now Pat. No. 9,827,935.

(51) Int. Cl.
| | |
|---|---|
| *A01B 69/00* | (2006.01) |
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |

(Continued)

(52) U.S. Cl.
CPC .......... *B60R 21/0136* (2013.01); *B60R 19/18* (2013.01); *B60R 19/20* (2013.01); *B60R 19/483* (2013.01); *G01M 7/08* (2013.01); *B60R 2019/188* (2013.01); *B60R 2019/1866* (2013.01)

(58) Field of Classification Search
CPC ...... G01M 7/08; B60R 21/0136; B60R 19/52; B60R 19/02; B60R 19/18; B60R 19/20; B60R 19/483; B60R 21/34
USPC .................. 701/41, 29; 293/102, 115; 303/7
See application file for complete search history.

(56) References Cited

U.S. PATENT DOCUMENTS

| | | |
|---|---|---|
| 7,104,354 B2 | 9/2006 | Ozaki |
| 7,635,043 B2 | 12/2009 | Breed |

(Continued)

FOREIGN PATENT DOCUMENTS

| | | |
|---|---|---|
| CN | 102227339 A | 10/2011 |
| EP | 1754636 A1 | 2/2007 |

(Continued)

OTHER PUBLICATIONS

Notification of Second Office Action from State Intellectual Property Office (SIPO) of People's Republic of China regarding Application No. 201510354169.1 dated Mar. 8, 2019 (3 pages).

*Primary Examiner* — Mahmoud S Ismail
(74) *Attorney, Agent, or Firm* — Frank A. MacKenzie; Bejin Bieneman PLC

(57) ABSTRACT

An apparatus includes a center component defining a center chamber therein and first and second side components defining first and second chambers therein, respectively. The first and second side components are coupled to opposing ends of the center component with the first and second chambers in fluid communication with the center chamber. The center, first side and second side components are configured to extend substantially across a width of a vehicle. The apparatus further includes first, second and third pressure sensors in communication with the first, second and center chambers, respectively.

18 Claims, 4 Drawing Sheets

(51) Int. Cl.
*G05D 1/00* (2006.01)
*G06F 7/00* (2006.01)
*G06F 17/00* (2019.01)
*B60R 21/0136* (2006.01)
*G01M 7/08* (2006.01)
*B60R 19/18* (2006.01)
*B60R 19/20* (2006.01)
*B60R 19/48* (2006.01)
*B60R 19/02* (2006.01)
*B60R 19/56* (2006.01)
*B60R 19/52* (2006.01)
*B60T 13/00* (2006.01)

(56) References Cited

U.S. PATENT DOCUMENTS

| | | |
|---|---|---|
| 8,740,268 B2 | 6/2014 | Ebara et al. |
| 2003/0111894 A1* | 6/2003 | Wattenburg ............ B60R 25/00 303/7 |
| 2006/0275013 A1 | 12/2006 | Hishida et al. |
| 2007/0027584 A1* | 2/2007 | Hau ................... B60R 21/0136 701/1 |
| 2007/0164574 A1* | 7/2007 | Tanabe .................. B60R 19/483 293/102 |
| 2009/0276112 A1* | 11/2009 | Mack ................... B60R 21/013 701/31.4 |
| 2009/0315344 A1* | 12/2009 | Joly-Pottuz ............ B60R 19/48 293/108 |
| 2011/0140464 A1* | 6/2011 | Mildner ................ B60K 11/04 293/115 |
| 2013/0080008 A1* | 3/2013 | Tanaka .................... F16H 61/12 701/62 |
| 2013/0124035 A1* | 5/2013 | Doerr ................. B60R 21/0132 701/32.2 |
| 2013/0147216 A1 | 6/2013 | Kim |
| 2014/0203577 A1 | 7/2014 | Nagwanshi et al. |

FOREIGN PATENT DOCUMENTS

| | | |
|---|---|---|
| JP | 2013220743 A | 10/2013 |
| WO | 2012113362 A1 | 8/2012 |

* cited by examiner

COLLISION SENSING APPARATUS

CROSS-REFERENCE TO RELATED APPLICATIONS

This application is a divisional of, and claims priority to, U.S. application Ser. No. 14/313,067 filed on Jun. 24, 2014, entitled "COLLISION SENSING APPARATUS", the contents of which are hereby incorporated herein by reference in their entirety.

BACKGROUND

Vehicles, such as automobiles, may include equipment for mitigating the impact of collisions, such as, e.g., passenger and side-curtain air bags in the occupant cabin. Optimal deployment of such collision mitigation equipment, however, may be dependent on the impact mode. For example, in an oblique impact mode, one vehicle may contact another vehicle at an approximately 15° oblique angle and with an approximately 35% overlap of the widths of the vehicles and generate relatively large rotational forces, as compared to other impact events. In another example, for mitigation of collisions with pedestrians, vehicles may include equipment such as bumper- or hood-mounted airbags and/or hood-lifting systems on the exterior of the vehicle. To control and employ such equipment, the vehicle is required to detect a corresponding collision—e.g. discriminate an oblique impact or a pedestrian impact from other impact events, and from each other. Current mechanisms for detecting vehicle collisions may be unable to sufficiently discriminate between impact events and/or may also suffer from drawbacks such as relatively high complexity and cost.

DRAWINGS

DETAILED DESCRIPTION

Figure 1:
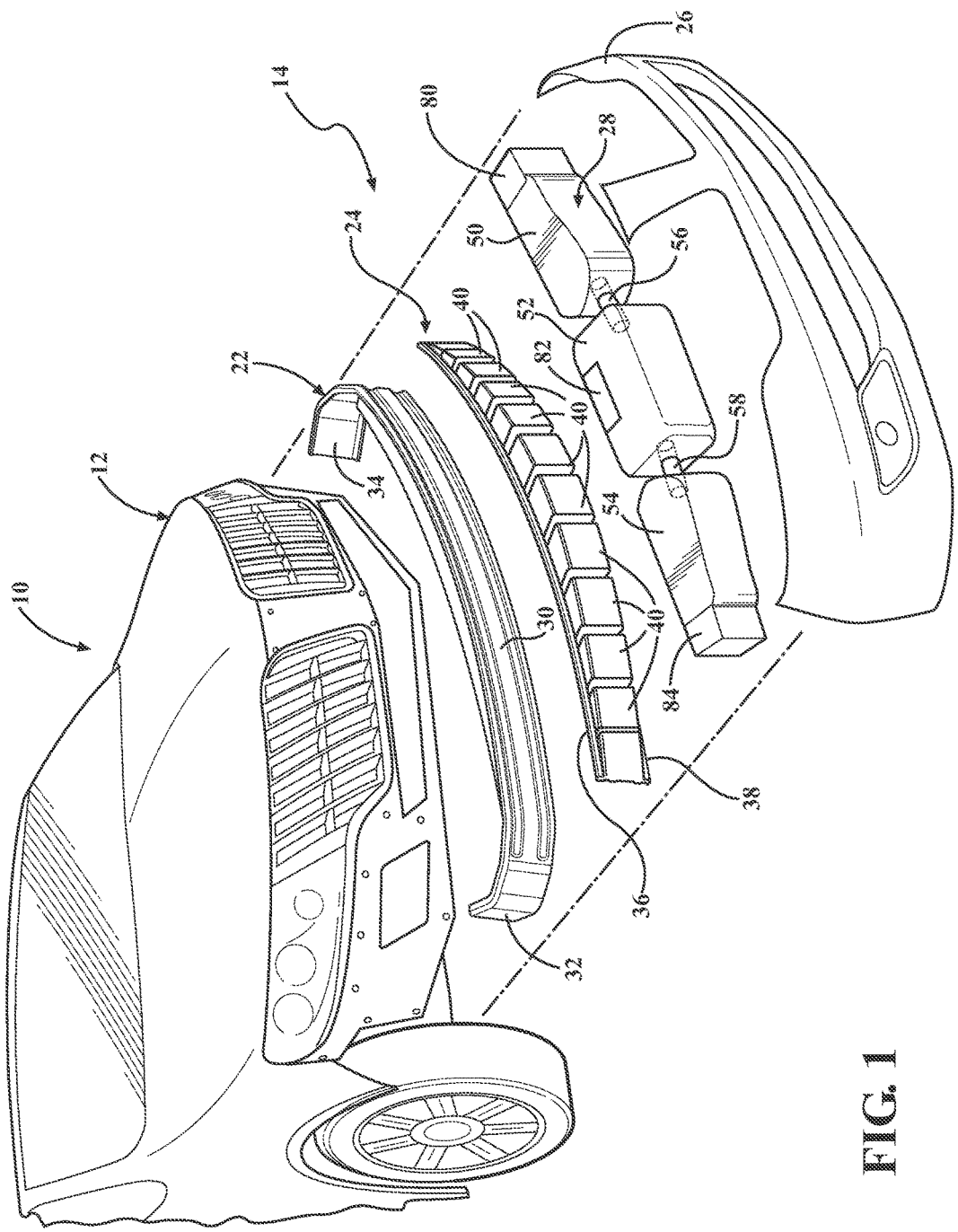
FIG. 1 is a partially exploded perspective view of an exemplary front end of a vehicle, including an exemplary sensing apparatus.

FIG. 1 is an exemplary illustration of a vehicle 10 with a front end 12. The vehicle 10 includes a front bumper assembly 14, illustrated in FIG. 1 in exploded view. The front bumper assembly 14 includes a bumper beam 22, an energy-absorbing component or energy absorber 24, and a front fascia component 26, as well as a multi-cavity sensing apparatus 28 disposed between the energy absorber 24 and the front fascia 26.

The bumper beam 22 includes a front face 30 with a curved shape that substantially spans the width of the front end 12 of the vehicle 10. The bumper beam 22 may further include rearward-extending portions 32 and 34 configured to couple to a frame assembly of the vehicle 10. The bumper beam 22 is a relatively rigid component of a material such as, for example, steel.

The energy-absorbing component 24 includes a rear face 36 sized and shaped to correspond with the front face 30 of the bumper beam 22, and it is fixed to the bumper beam 22. The energy-absorbing component 24 further includes a forward face 38 with a plurality of protrusions 40. The energy-absorbing component 24 is relatively elastic as compared to the bumper beam 22. For example, the energy absorbing component 24 be a plastic or foam component and the protrusions 40 may be adapted to deform, crush, or flatten in order to absorb kinetic energy in the event of a collision or impact with the front end 12 of the vehicle 10.

The front fascia component 26 overlaps and engages the assembly of the bumper beam 22, the energy-absorbing component 24, and the sensing apparatus 28 and attaches to the front end 12 of the vehicle 10. The sensing apparatus 28 has an overall width corresponding to the size of the forward face 38 of the energy absorber 24. The sensing apparatus 28 extends across the forward face 38 of the energy absorber 24 and is fixed in engagement therewith. The sensing apparatus 28 is shaped complementary to the forward face 38 of the energy absorber 24 and the interior of the front fascia component 26.

The front fascia component 26 is relatively thin as compared to the energy-absorbing component 24 and the sensing apparatus 28, and the front fascia component 26 is elastic as compared to the bumper beam 22. The front fascia component 26 may include material such as, for example, plastic. The sensing apparatus 28 is shaped complementary to, and in mechanical engagement with, the interior of the front fascia component 26. Therefore, a force applied to the exterior of the relatively thin front fascia component 26 in a location overlapping or otherwise mechanically engaged with the sensing apparatus 28 is translated to the sensing apparatus 28.

Figure 2:
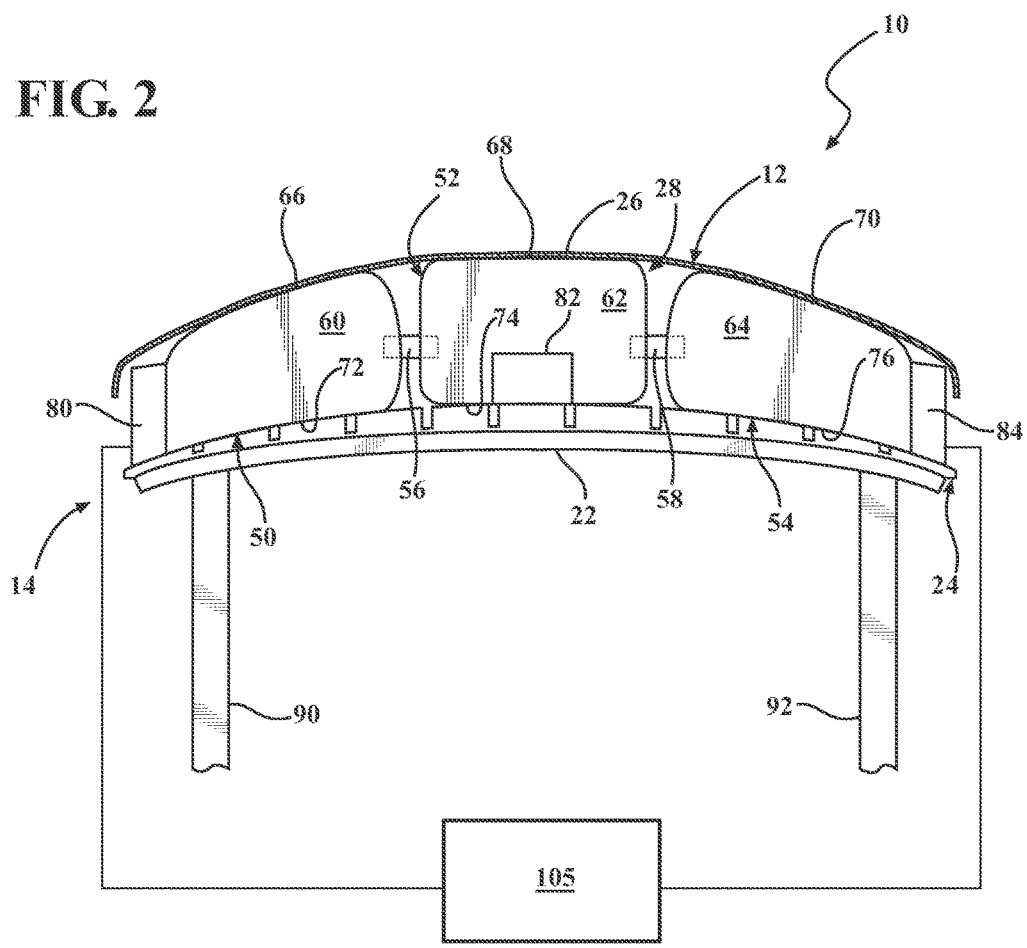
FIG. 2 is a partially schematic top view of the exemplary front end of the vehicle of FIG. 1, including the exemplary sensing apparatus.

With further reference to FIG. 2, the sensing apparatus 28 includes a left cavity or chamber 50, a center cavity or chamber 52 and a right cavity or chamber 54. The left cavity 50 and the center cavity 52 are coupled with a left channel portion 56 extending therebetween. The center cavity 52 and the right cavity 54 are coupled with a right channel portion 58 extending therebetween. In one exemplary implementation, the length of the left and right chambers 50 and 54 are each approximately 25-35% of the length of the bumper beam 22, and the length of the center chamber 52 is approximately 30-50% of the length of the bumper beam 22.

The left, center and right cavities 50, 52, 54 each substantially enclose fluid volumes 60, 62, 64, respectively. The left and right channel portions 56, 58 fluidly couple the volumes 60, 62, 64, and, therefore, enable the pressures in the volumes 60, 62, 64 to substantially equalize over time. In some implementations, the sensing apparatus 28 may be pressurized to a higher pressure than the volume outside thereof. The left, center and right cavities 50, 52, 54 each include a front surface, respectively denoted at reference numerals 66, 68, 70, and a rear surface, respectively denoted at reference numerals 72, 74, 76. The sensing apparatus 28 may be formed of any suitable materials, including, e.g., automotive grade pipe and blow-molded plastic, and may be formed as a unitary body of such suitable materials, such as blow-molded plastic.

The sensing apparatus 28 further includes left, center and right pressure sensors 80, 82, 84 respectively coupled to the left, center and right cavities 50, 52, 54 and in communication with the volumes 60, 62, 64, respectively. The pressure sensors 80, 82, 84 may be any suitable pressure sensor for automotive applications. As illustrated in FIGS. 1-2, the pressure sensors of the sensing apparatus 28 may be outside of the respective chambers thereof, such as the left and right pressure sensors 80 and 84, or integrated in to the shape of a chamber, such as the center pressure chamber 82. In other implementations, the pressure sensors of a sensing apparatus of the present disclosure may be disposed within the volumes of the chambers.

The bumper beam 22 is coupled to left and right frame rails 90, 92, and the pressure sensors 80, 82, 84 are in communication with a vehicle computing device or computer 105 of the vehicle 10. It should be understood that a sensing apparatus according to the present disclosure may vary in configuration with variations in shape and/or material composition across the width thereof, alone or in combination with variations in configuration, size or thickness as discussed herein. For example, a sensing apparatus according to the present disclosure may have a variety of cross-sectional shapes, including, for example, circular, elliptical, and rectangular.

Figure 3:
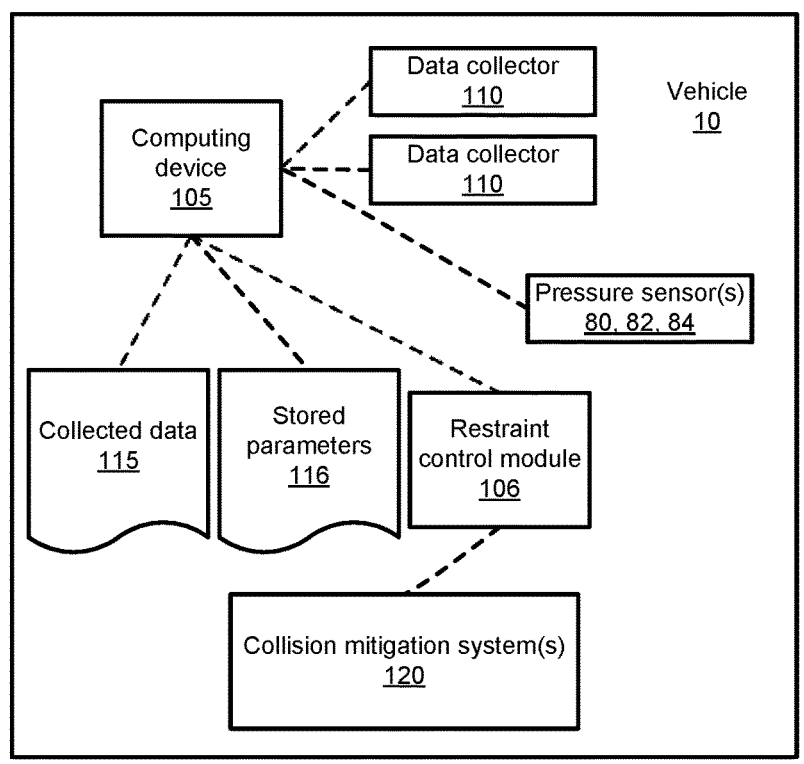
FIG. 3 is a block diagram of an exemplary vehicle system.

Referring to FIG. 3, the vehicle computing device or computer 105 in communication with the pressure sensors 80, 82, 84 of the sensing apparatus 28 generally includes a processor and a memory, the memory including one or more forms of computer-readable media, and storing instructions executable by the processor for performing various operations, including as disclosed herein. The computer 105 of the vehicle 10 receives information, e.g., collected data, from one or more data collectors 110 related to various components or conditions of the vehicle 10, e.g., components such as a braking system, a steering system, a powertrain, etc., and/or conditions such as vehicle 10 speed, acceleration, pitch, yaw, roll, etc. The computer 105 generally includes restraint control module 106 that comprises instructions for operating collision mitigation systems or equipment 120. Further, the computer 105 may include more than one computing device, e.g., controllers or the like included in the vehicle 10 for monitoring and/or controlling various vehicle components, e.g., a restraint control module 106, an engine control unit (ECU), transmission control unit (TCU), etc. The computer is generally configured for communications on a controller area network (CAN) bus or the like. The computer may also have a connection to an onboard diagnostics connector (OBD-II). Via the CAN bus, OBD-II, and/or other wired or wireless mechanisms, the computer may transmit messages to various devices in a vehicle and/or receive messages from the various devices, e.g., controllers, actuators, sensors, etc., including the pressure sensors 80, 82, 84 of the sensing apparatus 28 and collision mitigation systems or equipment 120. Alternatively or additionally, in cases where the computer actually comprises multiple devices, the CAN bus or the like may be used for communications between the multiple devices that comprise the vehicle computer. In addition, the computer may be configured for communicating with a network, which may include various wired and/or wireless networking technologies, e.g., cellular, Bluetooth, wired and/or wireless packet networks, etc.

Generally included in instructions stored in and executed by the computer 105 is a restraint control module 106. Using data received in the computer 105, e.g., from data collectors 110, including the pressure sensors 80, 82, 84, and data included as stored parameters 116, etc., the module 106 may control various vehicle 10 collision mitigation systems or equipment 120. For example, the module 106 may be used to deploy equipment responsive to an oblique impact event, such as side curtain air bags, or a pedestrian impact event, such as bumper- or hood-mounted airbags and/or hood-lifting systems. Further, the module 106 may include instructions for evaluating information received in the computer 105 relating to vehicle 10 operator characteristics, e.g., from pressure sensors 80, 82, 84 and/or other data collectors 110.

Data collectors 110 may include a variety of devices. For example, various controllers in a vehicle may operate as data collectors 110 to provide data 115 via the CAN bus, e.g., data 115 relating to vehicle speed, acceleration, etc. Data collectors 110 may include conventional crash or impact detectors, such as accelerometers. Yet other sensor data collectors 110 could include impact sensors such as pressure sensors 80, 82, 84. In addition, data collectors 110 may include sensors to detect a position, change in position, rate of change in position, etc., of vehicle 10 components such as a steering wheel, brake pedal, accelerator, gearshift lever, etc.

A memory of the computer 105 generally stores collected data 115. Collected data 115 may include a variety of data collected in a vehicle 10. Examples of collected data 115 are provided above, and moreover, data 115 is generally collected using one or more data collectors 110, and may additionally include data calculated therefrom in the computer 105, and/or at a server (not shown). In general, collected data 115 may include any data that may be gathered by a collection device 110 and/or computed from such data. Accordingly, collected data 115 could include a variety of data related to vehicle 10 operations and/or performance, data received from another vehicle, as well as data related to environmental conditions, road conditions, etc. relating to the vehicle 10. For example, collected data 115 could include data concerning a vehicle 10 speed, acceleration, pitch, yaw, roll, braking, presence or absence of precipitation, tire pressure, tire condition, etc.

A memory of the computer 105 may further store parameters 116. A parameter 116 generally governs control of a system or component of vehicle 10. These parameters may vary due to an environmental condition, road condition, vehicle 10 condition, or the like. In one example, parameters 116 may specify thresholds for determining frontal impacts, generally, and for identifying oblique frontal impacts from other frontal impacts and, thus, conditions for deployment of impact mitigation systems, such as passenger airbags and seat belt pre-tensioning systems, particularly tailored for the type of impact. In another example, parameters 116 may specify predetermined impact thresholds for identifying impacts with pedestrians and, thus, conditions for deployment of pedestrian impact mitigation systems such as bumper- or hood-mounted airbags and/or hood-lifting systems.

The sensing apparatus 28 provides a range of responses to impact forces applied to the front end 12 of the vehicle 10, toward sensing and identifying a collision or impact with the front end 12 of the vehicle 10. The left, center and right cavities 50, 52, 54 may be elastically deformable in response to relatively low impact forces, such as a collision of the vehicle 10 with a pedestrian, so as to generate a change in the pressure of one or more of the volumes 60, 62, 64, depending on the impact location and magnitude, which may be detected by pressure sensors 80, 82, 84, respectively. The pressure sensors 80, 82, 84 generate pressure signals from which the vehicle computer 105 may discriminate between the impact location and magnitude, so as to further control the operation of collision mitigation equipment and systems. For example, at the time immediately after the vehicle 10 experiences an oblique impact on the left side of the front end 12, the left pressure sensor 80 of the left chamber 50 senses a stronger pressure change than the center pressure sensor 82 of the center chamber 52, and the right pressure sensor 84 of the right chamber 54 senses little or no pressure change. By comparing the pressure differences between the three sensors various frontal impact modes, such as full frontal impact mode can be differentiated from the oblique impact. In some implementations, this discrimination between the pressure signals may be executed by the sensing apparatus 28 and the computer 105 in 20 milli-seconds or less. Over a longer period of time, in the absence of permanent deformation to the sensing apparatus 28, the pressure equalizes through the channels 56, 58.

Additionally, in an implementation in which the sensing apparatus 28 is pressurized relative to a volume outside thereof, the computer 105 may use signals from the pressure sensors 80, 82, 84 for failure mode prevention, e.g. to identify a leak in the sensing apparatus 28. For example, if the pressure of the volumes 60, 62, 64 drops over time, as opposed to equalizes as described herein, the computer 105 may generate a communication or signal identifying the leak.

Figure 4:
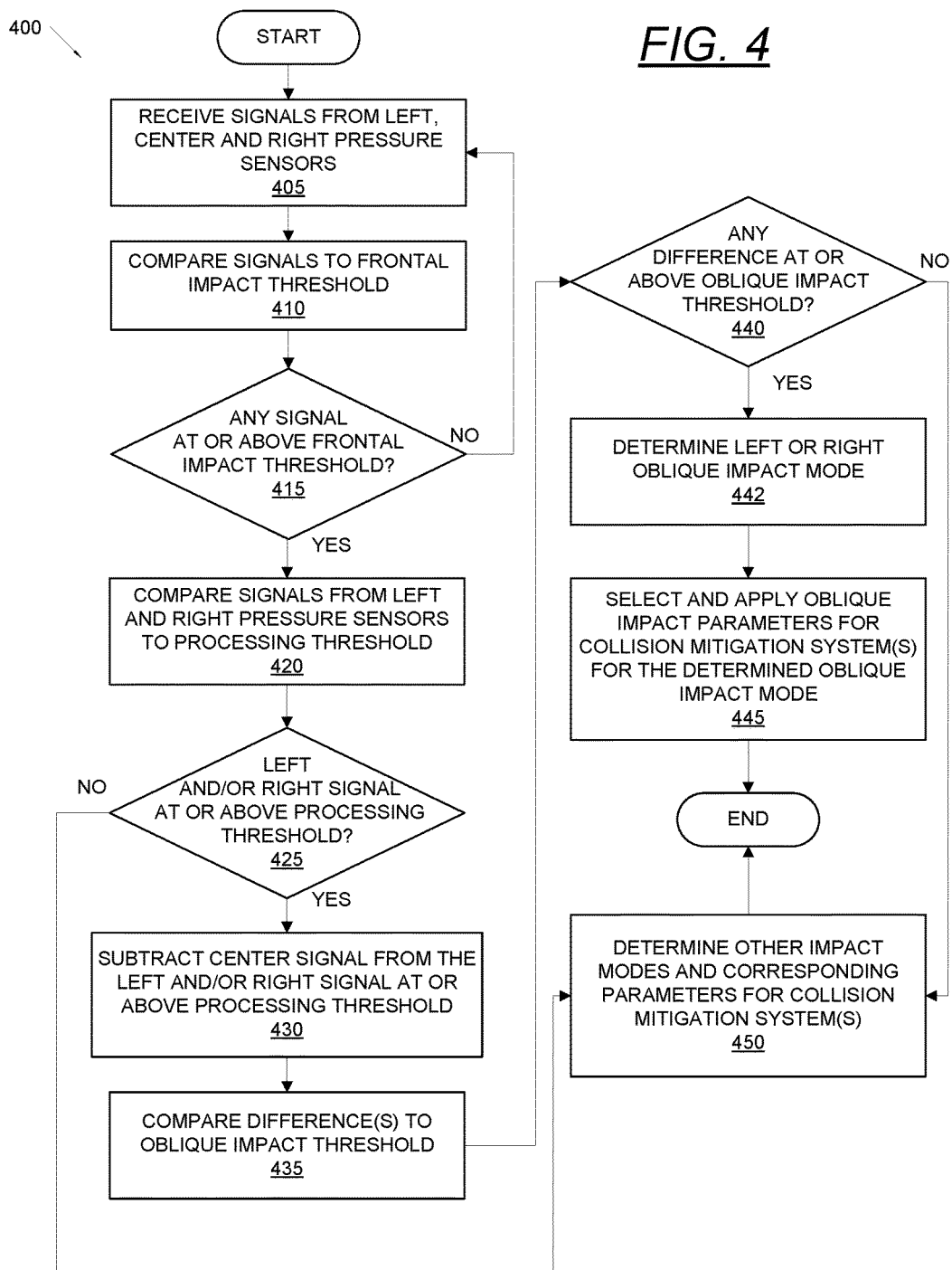
FIG. 4 illustrates an exemplary process for utilizing an exemplary sensing apparatus in collision detection and evaluation.

FIG. 4 is a diagram of an exemplary process 400 for utilizing an exemplary sensing apparatus of the present disclosure, e.g. sensing apparatus 28, to identify an oblique frontal impact with the vehicle 10. It should be understood that an exemplary sensing apparatus of the present disclosure, e.g. sensing apparatus 28, may be utilized in a variety of sensing applications in addition to or as an alternative to the exemplary process 400, e.g., to identify an impact with a pedestrian and to identify a head-on impact with another vehicle.

The process 400 begins in a block 405, in which the computer 105 of the vehicle 10 receives signals from the left, center and right pressure sensors 80, 82, 84. Next, in a block 410, the computer 105 respectively compares the signals from the left, center and right pressure sensors 80, 82, 84 to a frontal impact threshold value among the stored parameters 116. For example, the frontal impact threshold value may correspond to a minimum value that would be experienced by any part of the sensing apparatus 28 in the event of a collision of the front end 12 of the vehicle 10 with another vehicle or rigid object and which may necessitate the activation of occupant protection measures. Accordingly, next, in a block 415, if none of the pressure signals from pressure sensors 80, 82, 84 meets or exceeds the frontal impact threshold, the process 400 returns to the block 405. On the other hand, if any of the pressure signals from pressure sensors 80, 82, 84 meets or exceeds the frontal impact threshold, the process 400 continues to a block 420.

In the block 420, the computer 105 compares the signals from the left and right pressure sensors 80 and 84 with a processing threshold value among the stored parameters 116. For example, if the impact at either the left or right side of the sensing apparatus 28 meets or exceeds a certain severity, as set by the processing threshold value, the frontal impact identified relative to the frontal impact threshold may be further identified as at least involving the side corresponding with the one of the pressure sensors 80 and 84 providing a signal exceeding the processing threshold.

If, as determined at a block 425, one or both of the pressure sensors 80 and 84 does provide a signal exceeding the processing threshold, next, in a block 430, the computer 105 subtracts the signal from the center pressure sensor 82 from the one or both of the pressure sensors 80 and 84 providing a signal exceeding the processing threshold. Next, in blocks 435 and 440, the computer 105 compares the resultant difference to an oblique impact threshold value among the stored parameters 116. For example, in an at least offset frontal impact as identified by comparison of the signals of the pressure sensors 80, 82, 84 to the frontal impact threshold and/or the processing threshold, the difference calculated at the block 430 may meet or exceed the oblique impact threshold when the impact force is sufficiently concentrated to one of the sides of the vehicle 10, and thus at the sensing apparatus 28, as may be with an oblique impact between vehicles.

If, in the block 440, the oblique impact threshold has been determined to have been met or exceeded, then, at block 442, based on the output from blocks 435 and 440, the computer 105 determines if oblique impact is a left or right oblique impact. At block 445, the computer 105 selects operational parameters from the stored parameters 116 for the collision mitigation systems 120 for identified left or right oblique impact and applies those parameters, e.g. through the restraint control module 106. For example, oblique impact specific impact countermeasures, such as side curtain airbags, may be deployed, in the event an oblique impact is identified. Upon application of those parameters, the process 400 ends.

If, at the block 425, neither of the signals from the left or right pressure sensors are at or above the processing threshold, or, if, at the block 440, the difference calculated at the block 435 is not at or above the oblique impact threshold, the process 400 continues to the block 450, where other impact modes, and corresponding parameters for the collision mitigation systems 120, may be identified. Following the block 450, the process 400 ends.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It should be understood that, as used herein, exemplary refers to serving as an illustration or specimen, illustrative, or typical. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a processor and a memory, the memory storing instructions executable by the processor to:
   receive signals from left, center, and right pressure sensors respectively coupled to left, center, and right chambers extending across a vehicle front end, each of the left, center, and right chambers pressurized prior to deformation at a greater pressure than a pressure outside the chambers;
   determine that a difference between at least one of the signals of the left and right pressure sensors and the signal from the center pressure sensor, following one of deformation of the left chamber or deformation of the right chamber, meets an oblique impact threshold;
   select operational parameters for at least one vehicle collision mitigation system based on the received signals; and
   apply the selected operational parameters.

2. The system of claim 1, wherein the memory further stores instructions executable by the processor to determine that at least one of the signals from the left, center, and right pressure sensors meets a frontal impact threshold.

3. The system of claim 2, wherein the frontal impact threshold corresponds to a minimum value experienced by at least one of the left, center, and right pressure sensors during a collision of the vehicle front end, the instructions further including instructions to actuate at least one collision mitigation system upon detecting that the front impact threshold is exceeded.

4. The system of claim 1, wherein the memory further stores instructions executable by the processor to select the operational parameters based on a determination that at least one of the signals of the left and right pressure sensors meets a processing threshold.

5. The system of claim 1, wherein the memory further stores instructions executable by the processor to determine that at least one of the signals of the left and right pressure sensors identifies one of a right and a left oblique impact mode.

6. The system of claim 1, wherein the memory further stores instructions executable by the processor to identify a failure mode based on at least one of the signals from the left, center, and right pressure sensors.

7. The system of claim 6, wherein the failure mode is identified based on at least one of the signals from the left, center and right pressure sensors indicating a decrease in pressure over time.

8. The system of claim 1, wherein applying the selected operational parameters includes deploying a side curtain airbag.

9. The system of claim 1, wherein applying the selected operational parameters includes deploying at least one of a bumper mounted airbag, a hood mounted airbag, and a hood-lifting system.

10. A system comprising:
    a center component defining a center chamber therein;
    first and second side components defining first and second chambers therein, respectively, the first and second chambers in fluid communication with the center chamber, each of the first, second, and center chambers pressurized prior to deformation at a greater pressure than a pressure outside the chambers;
    first, second, and third pressure sensors in communication with the first, second and center chambers, respectively;
    a processor; and
    a memory storing instructions executable by the processor to:
       receive signals from the first, second, and third pressure sensors;
       determine that a difference between at least one of the signals of the first and second pressure sensors and the signal from the third pressure sensor meets an oblique impact threshold, the difference caused by one of deformation of the first chamber or deformation of the second chamber;
       select operational parameters for at least one vehicle collision mitigation system based on the received signals; and
       apply the selected operational parameters.

11. The system of claim 10, wherein the first side and second side components extend substantially across a width of a vehicle.

12. The system of claim 10, wherein the first and second side components are coupled to opposing ends of the center component.

13. The system of claim 10, wherein the center component and the first and second side components each include a forward surface having a shape to interface with a vehicle front fascia component.

14. The system of claim 10, wherein the first, second, and third pressure sensors are each arranged to detect pressure changes in the first, second, and center chambers, respectively, from forces within an elastic deformation threshold of the system.

15. A method, comprising:
    receiving signals from left, center, and right pressure sensors coupled to left, center, and right chambers, respectively, the left, center, and right chambers extending across a vehicle front end, the left, center, and right chambers pressurized prior to deformation at a greater pressure than a pressure outside the chambers;
    determining that a difference between at least one of the signals of the left and right pressure sensors and the signal from the center pressure sensor meets an oblique impact threshold, the difference caused by one of deformation of the left chamber or deformation of the right chamber;
    selecting operational parameters for at least vehicle one vehicle collision mitigation system based on the received signals; and
    applying the selected operational parameters.

16. The method of claim 15, further comprising determining that at least one of the signals from the left, center, and right pressure sensors meets a frontal impact threshold.

17. The method of claim 15, further comprising selecting the operational parameters based on a determination that at least one of the signals of the left and right pressure sensors meets a processing threshold.

18. The method of claim 15, further comprising identifying a failure mode based on at least one of the signals from the left, center, and right pressure sensors indicating a decrease in pressure over time.

\* \* \* \* \*